(12) United States Patent
Hatakeyama et al.

(10) Patent No.: US 12,538,019 B2
(45) Date of Patent: Jan. 27, 2026

(54) LENS APPARATUS AND IMAGE PICKUP APPARATUS THAT PROVIDE DIFFERENT FOCUS CONTROL MODES

(71) Applicant: CANON KABUSHIKI KAISHA, Tokyo (JP)

(72) Inventors: Yasuhiro Hatakeyama, Tokyo (JP); Koji Okada, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 161 days.

(21) Appl. No.: 18/462,546

(22) Filed: Sep. 7, 2023

(65) Prior Publication Data

US 2024/0098365 A1 Mar. 21, 2024

(30) Foreign Application Priority Data

Sep. 15, 2022 (JP) ................. 2022-146821

(51) Int. Cl.
*H04N 23/667* (2023.01)
*H04N 23/67* (2023.01)

(52) U.S. Cl.
CPC ........... *H04N 23/667* (2023.01); *H04N 23/67* (2023.01)

(58) Field of Classification Search
CPC .... H04N 23/667; H04N 23/67; H04N 23/633; H04N 23/672; H04N 23/673; H04N 23/6812; H04N 23/687; H04N 23/55; H04N 23/50
See application file for complete search history.

(56) References Cited

U.S. PATENT DOCUMENTS

| | | | | |
|---|---|---|---|---|
| 6,683,652 B1* | 1/2004 | Ohkawara | ............. | H04N 23/72 348/347 |
| 8,553,136 B2 | 10/2013 | Toyama et al. | | |
| 9,910,243 B2 | 3/2018 | Kindaichi et al. | | |
| 2006/0033831 A1* | 2/2006 | Ejima | ................. | H04N 23/843 348/333.01 |
| 2009/0115883 A1* | 5/2009 | Tsuchiya | ................ | G03B 13/00 348/E5.024 |

(Continued)

FOREIGN PATENT DOCUMENTS

| JP | 2004163565 A | 6/2004 |
|---|---|---|
| JP | 2013080246 A | 5/2013 |

(Continued)

*Primary Examiner* — Padma Haliyur
(74) *Attorney, Agent, or Firm* — ROSSI, KIMMS & McDOWELL LLP

(57) ABSTRACT

A lens apparatus connected to a camera, includes: a focus lens; a driving unit which drives the focus lens; an operation input unit; a mode switcher that switches between first and second modes relating to selection between AF and MF and a selection of an operation target of the operation input unit, and a controller, in which the controller, in the first mode, controls the driving unit based on an input from the operation input unit and controls a driving of the focus lens unit in MF, and in which the controller, in the second mode, outputs a control signal to change image pickup parameter based on input from the operation input unit, controls the driving unit in AF based on an AF control signal input from the camera when a set value input from the camera is AF-executable, and does not perform AF when the set value is AF-not-executable.

9 Claims, 8 Drawing Sheets

(56) References Cited

U.S. PATENT DOCUMENTS

| | | | | |
|---|---|---|---|---|
| 2013/0064533 A1* | 3/2013 | Nakata | ............... | G03B 17/02 |
| | | | | 396/76 |
| 2013/0194475 A1* | 8/2013 | Okamoto | ............ | H04N 23/635 |
| | | | | 348/333.01 |
| 2020/0007776 A1* | 1/2020 | Nagata | ................ | G02B 7/09 |
| 2020/0259992 A1* | 8/2020 | Ichinose | ............... | H04N 23/72 |
| 2021/0006709 A1* | 1/2021 | Honjo | ............... | G03B 13/34 |
| 2021/0243373 A1* | 8/2021 | Toyoda | .............. | H04N 23/675 |
| 2021/0243376 A1* | 8/2021 | Yoshino | ............. | G02B 23/243 |

FOREIGN PATENT DOCUMENTS

| | | | |
|---|---|---|---|
| JP | 2016206604 A | | 12/2016 |
| JP | 2017068174 A | | 4/2017 |

\* cited by examiner

FIG. 5A

AF DRIVING STATUS

|  | CAMERA MODE 1 | CAMERA MODE 2 |
|---|---|---|
| LENS MODE 1 | AF-OFF | AF-OFF |
| LENS MODE 2 | AF-ON | AF-OFF |
| LENS MODE 3 | AF-ON | AF-ON |

FIG. 5B

OPERATION RING STATUS

|  | CAMERA MODE 1 | CAMERA MODE 2 |
|---|---|---|
| LENS MODE 1 | MF | MF |
| LENS MODE 2 | IMAGE PICKUP PARAMETER OPERATION | IMAGE PICKUP PARAMETER OPERATION |
| LENS MODE 3 | (MF) | (MF) |

FIG. 8A

AF DRIVING STATUS

|  | CAMERA MODE 1 | CAMERA MODE 2 |
|---|---|---|
| LENS MODE 1 | AF-OFF | AF-OFF |
| LENS MODE 2 | AF-ON | AF-OFF |

FIG. 8B

OPERATION RING STATUS

|  | CAMERA MODE 1 | CAMERA MODE 2 |
|---|---|---|
| LENS MODE 1 | FOCUS OPERATION | FOCUS OPERATION |
| LENS MODE 2 | IMAGE PICKUP PARAMETER OPERATION | IMAGE PICKUP PARAMETER OPERATION |

LENS APPARATUS AND IMAGE PICKUP APPARATUS THAT PROVIDE DIFFERENT FOCUS CONTROL MODES

BACKGROUND OF THE INVENTION

Field of the Invention

The present invention relates to a lens apparatus and an image pickup apparatus.

Description of the Related Art

An interchangeable lens is provided with focusing means including a manual focusing to be manually adjusted and an automatic focusing to be automatically focused, and the interchangeable lens includes a focus operation ring to perform the manual focus and a means for switching between the automatic focusing and the manual focusing.

Japanese Patent Application Laid-Open No. 2013-080246 discloses a configuration in which means for switching between the automatic focusing and the manual focusing is provided on a camera, and the switching can be performed on the camera. In Japanese Patent Application Laid-Open No. 2004-163565 discloses a configuration in which the automatic focusing, the manual focusing, and custom setting can be switched on an interchangeable lens, and contents of the custom setting can be set by an operation unit on the interchangeable lens.

On the other hand, in recent years, there is a camera system in which the focus operation ring can be assigned as a control operation ring which can operate not only the focus operation but also a photographing parameter of the camera, such as an ISO sensitivity. In such a camera system, switching means for switching the role of the operation ring between the focus operation ring and the control operation ring is provided on the lens.

In a camera system provided with the above-described background art, it is desirable that switching between the automatic focusing and the manual focusing during photographing by a user and switching between a control operation and a focus operation by an operation ring can be performed by one operation means.

SUMMARY OF THE INVENTION

It is an object of the present disclosure to provide a lens apparatus advantageous in operability for changing settings of an operation mode.

According to one aspect of the present disclosure, a lens apparatus which is connected to a camera apparatus, includes: a focus lens unit which is movable in an optical axis direction; a driving unit which drives the focus lens unit; an operation input unit; a mode switching unit that switches between a plurality of modes, including a first mode and a second mode, relating to a selection between an automatic focusing and to a manual focusing and a selection of an operation target of the operation input unit, and a lens controller, in which in the first mode, the lens controller is configured to control the driving unit based on an operation input from the operation input unit and control a driving of the focus lens unit in the manual focusing, and in which in the second mode, the lens controller is configured to output a control signal to change an image pickup parameter based on an input from the operation input unit, control the driving unit in the automatic focusing based on an AF control signal input from the camera apparatus when a set value input from the camera apparatus is AF-executable, and is configured not to perform the automatic focusing when the set value is AF-not-executable.

According to the present disclosure, it is possible to provide a lens apparatus advantageous in operability of changing the setting of the operation mode.

Further features of the present invention will become apparent from the following description of exemplary embodiments with reference to the attached drawings.

BRIEF DESCRIPTION OF THE DRAWINGS

FIG. 5A is an explanatory diagram relating to a combination at the time of mode selection according to Embodiment 1.

FIG. 5B is an explanatory diagram relating to the combination at the time of mode selection according to Embodiment 1.

FIG. 8A is an explanatory diagram relating to a combination at the time of mode selection according to Embodiment 2.

FIG. 8B is an explanatory diagram relating to the combination at the time of mode selection according to Embodiment 2.

DESCRIPTION OF THE EMBODIMENTS

Figure 1:
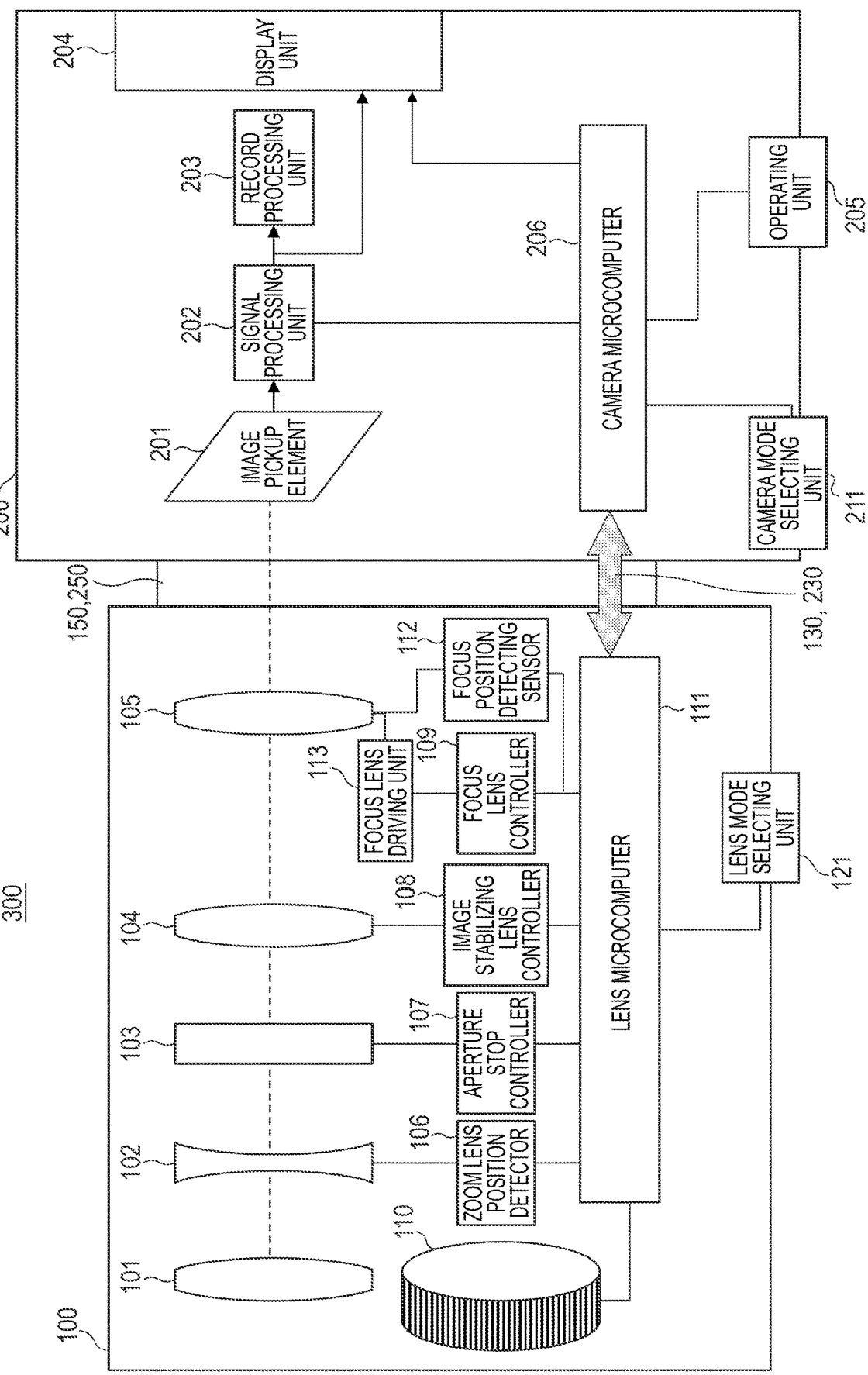
FIG. 1 is a block diagram showing an image pickup apparatus according to the present disclosure.

Preferred embodiments of the present disclosure will now be described in detail with reference to the accompanying drawings.

The following embodiments do not limit the configuration according to the claims of the present application. Although a plurality of features are described in the present embodiment, all of these features are not necessarily required, and a plurality of features may be arbitrarily combined. Further, in the accompanying drawings, the apparatus is drawn at a different scale from the actual scale in order to facilitate understanding of the apparatus, and the same or similar components are denoted by the same reference numerals and redundant description thereof is omitted.

Embodiment 1

FIG. 1 is a block diagram showing an example of a configuration according to Embodiment 1 of the present disclosure.

The lens apparatus 100 of the present disclosure is attachably and detachably connected to the camera apparatus 200, and the lens apparatus 100 and the camera apparatus 200 constitute an image pickup apparatus 300.

Specific configurations of the lens apparatus 100 and the camera apparatus 200 will be described.

The lens apparatus 100 and the camera apparatus 200 are mechanically and electrically connected to each other via a mount 150 of the lens apparatus 100 and a mount 250 of the camera apparatus 200. The lens apparatus 100 receives power from the camera apparatus 200 via a power supply terminal (not shown) provided in the mount 150 and the mount 250. In the lens apparatus 100, controlling of various actuators and the lens microcomputer 111 described later are carried out by power received from the camera apparatus 200. The camera apparatus 200 controls the lens apparatus 100 by communicating a control command with the lens apparatus 100 via a communication terminal (not shown) provided in the mount 150 and the mount 250.

The configuration of the camera apparatus 200 will be described.

The camera apparatus 200 includes an image pickup element 201 including a phase difference AF sensor, a signal processing unit 202, a recording processing unit 203, a display unit 204, an operation unit 205, a camera microcomputer 206, and a camera mode selecting unit 211.

The image pickup element 201 photoelectrically converts an object image formed by an image pickup optical system in the lens apparatus 100 and outputs an electric signal (analog signal). The analog signal from the image pickup element 201 is converted into a digital signal by an A/D conversion circuit (not shown).

The signal processing unit 202 performs various image processing's on the digital signal from the A/D conversion circuit to generate a video signal. The signal processing unit 202 also generates, from the video signal, defocus information indicating a contrast state of the subject image, i.e., the in-focus state of the image pickup optical system, and luminance information indicating an exposure state.

The signal processing unit 202 outputs the video signal to a display unit 204. The display unit 204 displays the video signal as a live view image used to confirm the composition, the focus state, and the like. Specifically, the display unit 204 is a rear liquid crystal of the camera apparatus 200, an electronic view finder, or the like. Further, the signal processing unit 202 outputs the video signal to a recording processing unit 203, and the recording processing unit 203 stores the video signal as still images or moving image data in an external memory or the like.

A camera microcomputer 206 as a camera controller controls the camera apparatus 200 in accordance with inputs of an image pickup instruction switch and various setting switches of the operation unit 205.

Further, the camera microcomputer 206 transmits, via the camera communication unit 230, a control command related to the focusing operation of the focus lens unit 105 according to defocus information generated from an output of the phase difference detection pixel (not shown) provided in the image pickup element to the lens microcomputer 111. The camera mode selecting unit 211 is means for selecting (switching) a camera AF mode described later. As will be described later in detail, the camera mode selecting unit 211 switches the camera AF mode for specifying the presence or absence of the automatic focus driving (the AF driving state) when the lens mode selecting unit 121 selects an image pickup parameter changing mode described later.

The configuration of the lens apparatus 100 will be described.

The lens apparatus 100 includes the image pickup optical system, the lens microcomputer 111, a driving unit that is a driving unit of the image pickup optical system, a controller that controls the driving unit, various position detectors that detect the position of the optical element, an operation ring 110, and a lens mode selecting unit (mode switching unit) 121.

The image pickup optical system includes a field lens unit 101, a zoom lens unit 102 for zooming, an aperture stop unit 103 for adjusting an amount of light, an image stabilization lens 104, and a focus lens unit 105 for adjusting a focus, but is not limited to this configuration.

The lens microcomputer 111 is a controller that controls the operation of each unit in the lens apparatus 100. The lens microcomputer 111 receives a control command transmitted from the camera apparatus 200 via the lens communication unit 130, which is an information communication unit, and receives a lens data transmission request and a camera data reception request. The lens microcomputer 111 performs lens control corresponding to the control command, and transmits lens data corresponding to a transmission request from the camera apparatus 200 to the camera apparatus 200. When receiving a reception request from the camera apparatus 200, the lens microcomputer 111 receives data from the camera apparatus 200. The lens microcomputer 111 performs light amount adjustment and focus adjustment, which will be described later, in response to a command relating to light amount adjustment and focusing among control commands.

The zoom lens unit 102 is movable in the optical axis direction indicated by a broken line in the figure, and is driven in the optical axis direction by the user operating a zoom operation ring coupled to a zoom mechanism (not shown). The focal length of the image pickup optical system is changed by the movement of the zoom lens unit 102, and zooming is performed. The zoom lens position detector 106 detects the position of the zoom lens unit 102 using a position detection sensor such as a variable resistor, and outputs position data to the lens microcomputer 111. The output position data is used by the lens microcomputer 111 to generate focal length information.

The aperture stop unit 103 includes a sensor such as an aperture blade and a photointerrupter that detects a state of the aperture blade. The state of the aperture blade is output to the lens microcomputer 111. The aperture stop controller 107 outputs a drive signal in response to a command from the lens microcomputer 111 to drive actuators such as a stepping motor and a voice coil motor, and adjusts an amount of light by the aperture stop unit 103.

The image stabilization lens 104 moves in a direction orthogonal to the optical axis of the image pickup optical system to reduce image blur caused by shaking or the like. The image stabilizing lens controller 108 outputs a drive signal in accordance with a command from the lens microcomputer 111 in accordance with the shaking detected by a sensor (not shown) such as a vibration gyroscope, and drives the image stabilization actuator. Thereby, the image stabilization processing for controlling the shift operation of the image stabilization lens 104 is performed.

The focus lens unit 105 is movable in the optical axis direction indicated by a broken line in the figure, detects the position of the focus lens unit 105 using a focus position detecting sensor 112 such as a photointerrupter, and outputs the position data to the lens microcomputer 111. The focus lens controller 109 outputs a drive signal in response to a command from the lens microcomputer 111 to drive the focus lens driving unit 113, and moves the focus lens unit 105 to perform focus adjustment.

The operation ring 110 is a rotating operation member rotatably held on the outer periphery of a lens barrel, and has a detector that detects a relative operation amount (rotation amount) around the optical axis, and outputs the detection value to the lens microcomputer 111. In a first focus lens driving mode described later, the operation ring 110 serves as a rotating operation member for manually driving the focus lens unit 105. In an image pickup parameter changing mode to be described later, the operation ring 110 serves as an operation input means for changing the image pickup parameters by the camera microcomputer 206.

The lens mode selecting unit 121 is means for selecting (switching) a lens mode relating to an AF driving state and an operation ring state (function associated with the operation ring 110), which will be described later.

As a focus function for performing focus adjustment by driving the focus lens unit 105, there are a manual focusing (MF) which is a first focus lens driving mode and an automatic focusing (AF) which is a second focus lens driving mode.

In order to perform an automatic focusing, the lens communication unit 130 transmits focus position information to the camera microcomputer 206 in response to a lens data transmission request from the camera microcomputer 206. The lens communication unit 130 receives a focus driving command from the camera microcomputer 206 in response to a reception request of camera data from the camera microcomputer 206.

The focus position information is information generated by the lens microcomputer 111 based on information of the focus position detecting sensor 112, and is configured by an image pickup distance information indicating a focusing distance, address information which is a digital value obtained by dividing a focus moving area, and the like.

The camera microcomputer 206 transmits a focus driving command to the lens microcomputer 111 via the camera communication unit 230, and the lens microcomputer 111 drives the focus lens unit 105 in accordance with the focus driving command received via the lens communication unit 130. Further, the lens microcomputer 111 transmits the focus position information to the camera microcomputer 206 via the lens communication unit 130.

In AF, the camera microcomputer 206 derives an in-focus position of the focus lens unit 105 from defocus information and focus position information generated based on the output from the image plane phase difference pixels in the image pickup element 201. The camera microcomputer 206 transmits a focus driving command (AF control signal) to the lens microcomputer 111 via the camera communication unit 230, and the lens microcomputer 111 drives the focus lens unit 105 in accordance with the focus driving command received via the lens communication unit 130. Further, the lens microcomputer 111 transmits the focus position information to the camera microcomputer 206 via the lens communication unit 130.

In MF, the lens microcomputer 111 outputs a drive command to the focus lens controller 109 according to the operation amount of the operation ring 110 to drive the focus lens driving unit 113, and moves the focus lens unit 105.

In this specification, a state in which AF can be executed is referred to as "AF-ON" (automatic focus executable), and a state in which AF cannot be executed is referred to as "AF-OFF" (automatic focus not executable).

The focus preset functions of the lens apparatus 100 and the camera apparatus 200 of the image pickup apparatus 300 according to the present embodiment will be described with reference to FIGS. 1, 2A, 2B, 2C, 3A and 3B.

Figure 2A:
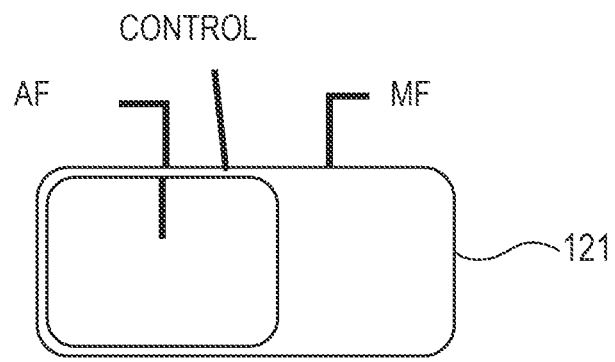
FIG. 2A is an explanatory diagram of a lens mode selecting unit according to Embodiment 1.
Figure 2B:
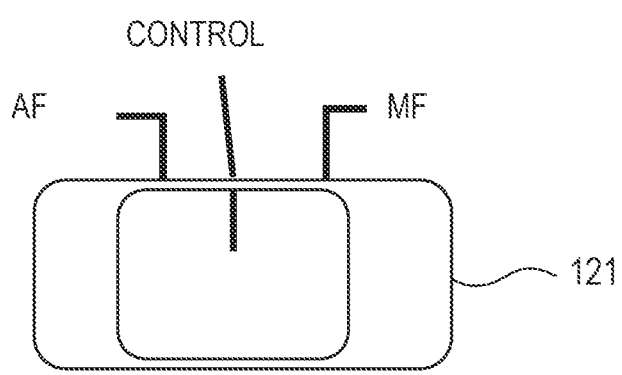
FIG. 2B is an explanatory diagram of the lens mode selecting unit according to Embodiment 1.
Figure 2C:
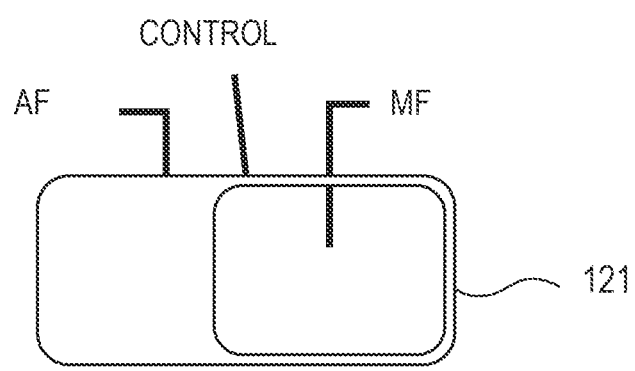
FIG. 2C is an explanatory diagram of the lens mode selecting unit according to Embodiment 1.

With reference to FIGS. 2A, 2B, and 2C, the focus preset function of the lens mode selecting unit 121 will be described. In the present embodiment, the lens mode selecting unit 121 can select the lens mode between three modes of the lens mode 1 (MF: first mode), the lens mode 2 (CONTROL: second mode), and the lens mode 3 (AF: third mode). As shown in FIGS. 2A, 2B, and 2C, in the present embodiment, the lens mode selecting unit 121 is configured by a slide-type switch, but the present disclosure is not limited thereto, and the lens mode selecting unit 121 may be configured by a rotary switch with a rotation end.

Figure 3A:
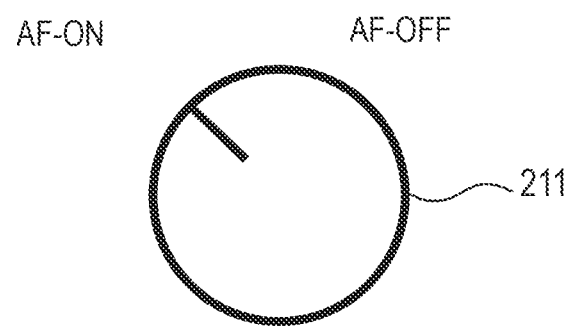
FIG. 3A is an explanatory diagram of a camera mode selecting unit according to Embodiment 1.
Figure 3B:
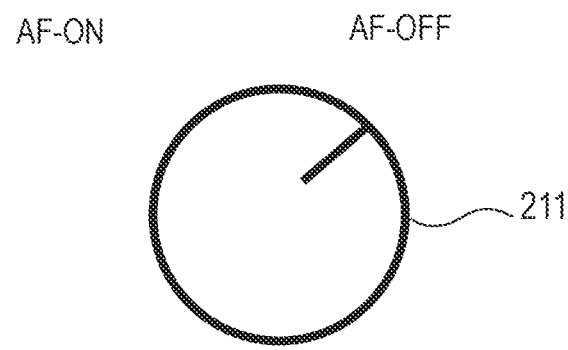
FIG. 3B is an explanatory diagram of the camera mode selecting unit according to Embodiment 1.

The focus preset function of the camera mode selecting unit 211 will be described with reference to FIGS. 3A and 3B.

The camera mode selecting unit (AF switching means) 211 is a selecting unit of a camera mode as the AF driving state described above, and is capable of switching between the camera mode 1 (AF-ON) and the camera mode 2 (AF-OFF). Although "AF-OFF" is denoted here, a state in which AF driving is stopped may be generally denoted as "MF", so that AF and MF may be denoted. The camera mode (AF setting value) selected by the camera mode selecting unit 211 is output from the camera microcomputer 206 to the lens microcomputer 111 via the camera communication unit 230 and the lens communication unit 130, and is acquired by the lens microcomputer 111. The camera mode selected by the camera mode selecting unit 211 is used to determine whether the focus control is set to AF-ON or AF-OFF when the lens mode 2 (CONTROL) is selected by the lens mode selecting unit 121.

Figure 4A:
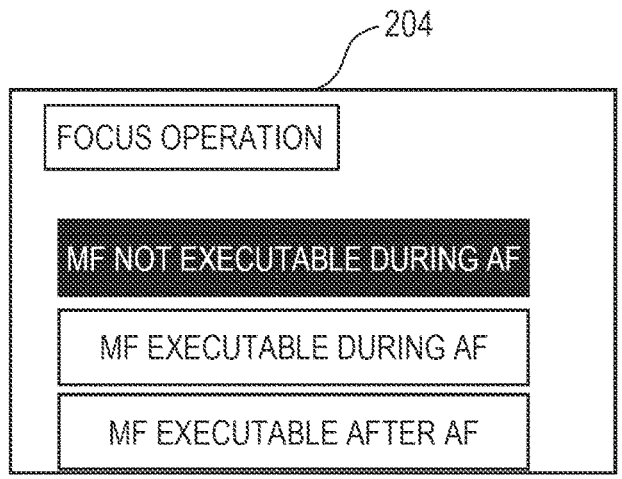
FIG. 4A is an explanatory diagram relating to a focus operation according to Embodiment 1.
Figure 4B:
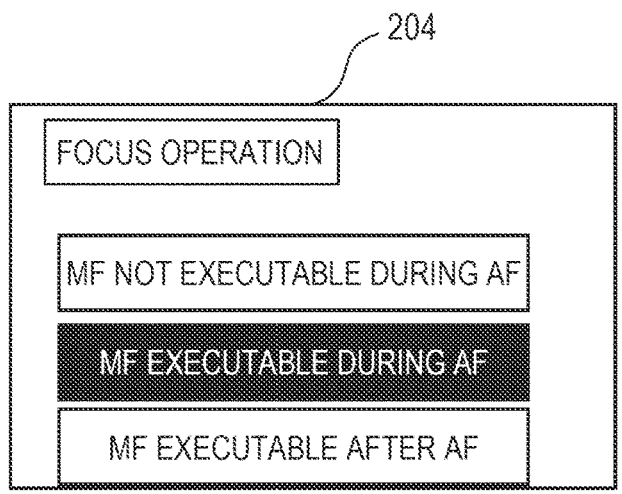
FIG. 4B is an explanatory diagram relating to the focus operation according to Embodiment 1.
Figure 4C:
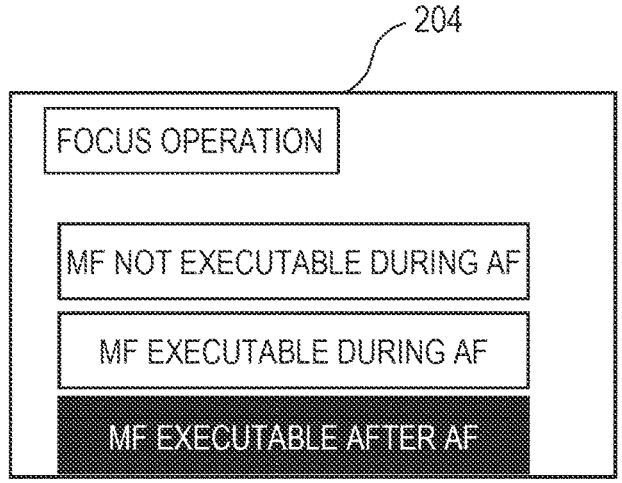
FIG. 4C is an explanatory diagram relating to the focus operation according to Embodiment 1.
Figure 6A:
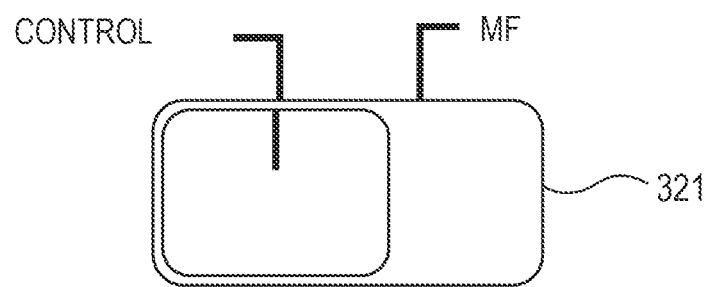
FIG. 6A is an explanatory diagram of a lens mode selecting unit according to Embodiment 2.
Figure 6B:
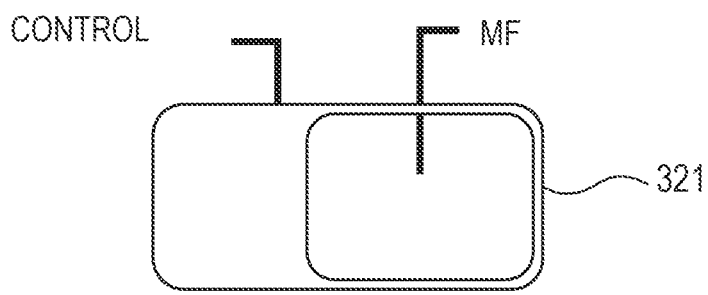
FIG. 6B is an explanatory diagram of the lens mode selecting unit according to Embodiment 2.
Figure 7A:
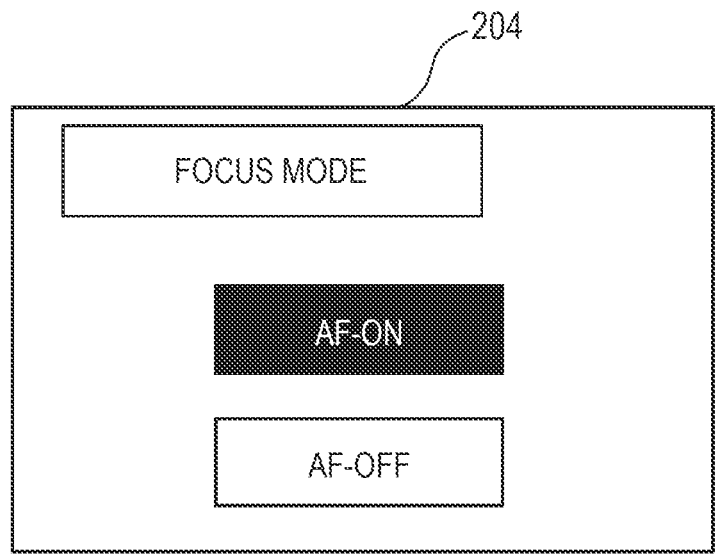
FIG. 7A is an explanatory diagram of a camera mode selecting unit according to Embodiment 2.
Figure 7B:
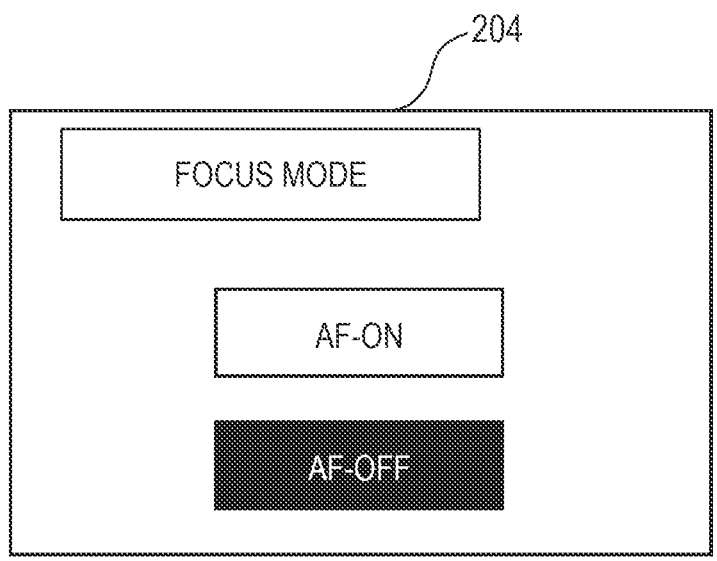
FIG. 7B is an explanatory diagram of the camera mode selecting unit according to Embodiment 2.

With reference to FIGS. 4A, 4B, and 4C, settings relating to an MF interrupting operation during AF control when the lens mode selecting unit 121 selects the lens mode 3 (AF) will be described.

In the camera apparatus 200 according to the present embodiment, it is possible to set an interruption by a MF operation by the operation ring 110 in a state in which the lens mode 3 (AF) is set by the operation of the selection screen (MF interruption switching means) displayed on the display unit 204.

FIG. 4A shows a state in which MF-not-executable-during-AF mode is selected, and the MF operation cannot be performed in a state in which AF is executable (AF-ON). FIG. 4B shows a state in which MF-executable-during-AF mode is selected, and the MF operation can be performed even in a state in which AF is executable (AF-ON) and the focus lens unit 105 is driven in accordance with the operation of the operation ring 110 even during AF driving.

FIG. 4C shows a state in which MF-executable-after-AF mode is selected, and the MF operation becomes executable after AF is executed and an in-focus state is obtained. After the MF operation after AF is executed, the AF control may not be started until a defocus amount of a predetermined extent is detected or a predetermined time elapses.

Although a configuration in which the setting relating to the MF operation during AF can be arbitrarily set by the setting operation in the selection screen displayed on the display unit 204 in the camera apparatus 200 is described, the present disclosure is not limited to the configuration. The setting may be changed by a mechanical switch, or any one of the MF-not-executable-during-AF mode, the MF-executable-during-AF mode, and the MF-executable-after-AF mode may be held as a predetermined value in the image pickup apparatus 300.

Referring to FIGS. 5A and 5B, an AF driving state and an operation ring state based on a combination of the camera mode selecting unit 211 and the lens mode selecting unit 121 of the present embodiment will be described.

In the case of the lens mode 1 (MF), the AF driving state is AF-OFF regardless of the selection by the camera mode selecting unit 211. In the operation ring state, the operation target of the operation ring 110 becomes the focus lens unit 105, and the MF operation is enabled by operating the operation ring 110.

In the case of the lens mode 2 (CONTROL), the operation ring state is determined by the image pickup parameter set by setting means (not shown). The AF driving state is AF-ON when the camera mode 1 is selected by the camera mode selecting unit 211, and is AF-OFF when the camera mode 2 is selected.

In the case of the lens mode 3 (AF), the AF driving state is AF-ON regardless of the selection by the camera mode selecting unit 211. As to the operation ring state, depending on the setting relating to the MF interruption operation during the AF described above, the operation target of the operation ring 110 becomes the focus lens unit 105 and the MF interruption operation is executable, or nothing is assigned as the operation target of the operation ring 110.

As described above, the combination of the camera mode selecting unit 211 and the lens mode selecting unit 121 enables the operator to switch the modes of the AF driving state and the operation ring state by operating one operation unit (lens mode selecting unit 121) of the lens apparatus 100.

For example, when the exposure (aperture stop value) is adjusted while watching the captured image after an in-focus state is once obtained, the camera mode 2 (AF-OFF) is selected by the camera mode selecting unit 211. By switching to the lens mode 2 (CONTROL) after focusing is performed in a state in which the lens mode 1 (MF) or the lens mode 3 (AF) is selected, parameter operation (exposure adjustment) preset without changing the focusing state can be performed. During this operation, the photographer can pick up images with a desired mode change only by operating the lens mode selecting unit 121 of the lens apparatus 100. In this way, it is possible to realize the mode switching that can avoid a change in the in-focus state caused by AF at a timing not intended by the photographer during the photographing operation only by operating the lens mode selecting unit 121.

When it is desired to perform an emergency MF operation when a desired in-focus state cannot be obtained by AF, the camera mode 1 (AF-ON) may be selected by the camera mode selecting unit 211. Thereby, unless the lens mode 1 (MF) is selected by the lens mode selecting unit 121, the AF-ON state and a state in which the image pickup parameter can be operated can be set. Further, if necessary, by switching to the lens mode 1 (MF), it is possible to immediately perform the MF operation by operating the operation ring 110.

The lens mode selecting unit 121 is preferably configured to have the respective modes arranged in the order shown in FIGS. 2A, 2B, and 2C. By arranging the lens modes 1 and 3 that are selected with a high frequency at both ends and arranging the lens mode 2 which is selected with a relatively low frequency of use and relatively little switching to other modes after setting, so that visual confirmation is not required for switching to the lens modes 1 and 3, and operability is improved.

When the mode is switched to the lens mode 2 (CONTROL), image pickup parameters that can be operated include, for example, exposure (aperture stop value), ISO sensitivity, shutter speed, and white balance adjustment.

Embodiment 2

A lens apparatus and an image pickup apparatus according to a second embodiment of the present disclosure will be described with reference to FIGS. 6A, 6B, 7A, 7B, 8A and 8B.

As shown in FIGS. 6A, 6B, 7A and 7B, the lens apparatus according to the present embodiment includes a lens mode selecting unit 321, and enables switching between a lens mode 1 (MF: first mode) and a lens mode 2 (CONTROL: second mode). The camera mode selecting unit 211 is configured to select through a focus mode selection screen displayed on the display unit 204.

Referring to FIGS. 8A and 8B, an AF driving state and an operation ring state based on a combination of a selection by the lens mode selecting unit 321 and a selection in the focus mode selection screen will be described.

In the case of the lens mode 1 (MF), the AF driving state is AF-OFF regardless of the selection of the focus mode selection screen. In the operation ring state, the operation target of the operation ring 110 becomes the focus lens unit 105, and the MF operation is enabled by operating the operation ring 110.

In the case of the lens mode 2 (CONTROL), the operation ring state is determined by the image pickup parameter set by the setting means (not shown). The AF driving state is AF-ON when the camera mode 1 is selected on the focus mode selection screen, and is AF-OFF when the camera mode 2 is selected.

In the present embodiment, switching from switching among three values to switching between two values is performed in order to save space and reduce size of operation members of the lens apparatus 100, and switching using the display unit 204 instead of switching mechanically is adopted in order to reduce operation members of the camera and suppress erroneous operation.

By setting the camera mode 1, the photographer can realize the switching between AF-ON and AF-OFF and the switching by use of the operation ring state only by operating the lens mode selection unit 321 of the lens apparatus.

The lens apparatus having the configuration of this embodiment can provide a more compact and inexpensive camera system.

In the lens apparatus according to the present embodiment, the lens mode 1 (MF) and the lens mode 2 (CONTROL) are used as options for switching in the lens mode selection unit 321, but the present disclosure is not limited thereto. For example, in a product for an entry user that performs only an AF operation, the lens mode selecting unit 321 may have two options for switching including the lens mode 2 (CONTROL) and the lens mode 3 (AF).

According to this configuration, for example, when the exposure is adjusted while watching an image being picked up after once obtaining an in-focus state, the camera mode 2 (AF-OFF) is selected on the focus mode selection screen. After focusing is performed in a state in which the lens mode 3 (AF) is selected by the lens mode selecting unit 321, by switching to the lens mode 2 (CONTROL), parameter operation (exposure adjustment) preset without changing the focusing state can be performed. During this operation, the photographer can perform desired photographing only by operating the lens apparatus 100. In this way, it is possible to realize the mode switching that can avoid a change in the in-focus state by AF operation at a timing not intended by the photographer during an image pickup operation only by operating the lens mode selecting unit 321.

In the embodiments described above, the lens apparatus is a so-called interchangeable lens, and the interchangeable lens and the camera apparatus are detachable, but the present disclosure is not limited thereto. The present disclosure can be applied not only to a configuration in which the lens apparatus and the camera apparatus are detachable but also to an image pickup apparatus in which the lens apparatus and the camera apparatus are integrated, and similar effects can be obtained.

Although preferred embodiments of the present disclosure have been described above, the present disclosure is not limited to these embodiments, and various modifications and changes can be made without departing from the scope of the present disclosure, such as a selection mechanism, a display name, and a mode order.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-146821, filed Sep. 15, 2022, which is hereby incorporated by reference herein in its entirety.

What is claimed is:

1. An image pickup apparatus comprising: a processor controlled camera apparatus
    that provides an AF-executable setting and an AF-not-executable setting; and
    a lens apparatus connected to the camera apparatus, the lens apparatus comprising:
        a driving unit configured to move a focus lens unit;
        an operation unit configured to be operable by a user;
        a mode switching unit configured to be switchable among a first mode, a second mode, and a third mode; and
        a lens controller, wherein:
            in the first mode, the lens controller performs a manual focusing in which the driving unit is controlled based on an operation of the operation unit;
            in the second mode:
                an image pickup parameter different from a parameter changed in the first mode is changed based on the operation of the operation unit;
                the lens controller performs an automatic focusing in which the driving unit is controlled based on a control signal from the camera apparatus, in a state where the camera apparatus is set to the AF-executable setting; and
                the lens controller does not perform the automatic focusing in a state where the camera apparatus is set to the AF-not-executable setting; and
            in the third mode, whether the manual focusing is allowable or not is switchable.

2. The image pickup apparatus according to claim 1, wherein in the third mode, the manual focusing is allowed when the operation unit is operated after the automatic focusing is performed.

3. The image pickup apparatus according to claim 2, wherein in the third mode, in a state where the manual focusing is performed after the automatic focusing, the automatic focusing is not started until a predetermined defocus amount is reached.

4. The image pickup apparatus according to claim 2, wherein in the third mode, in a state where the manual focusing is performed after the automatic focusing is performed, the automatic focusing is not started until a predetermined time elapses after the manual focusing is performed.

5. The image pickup apparatus according to claim 1, wherein the camera apparatus includes an MF switching unit configured to switch between the manual focusing being allowed or not.

6. The image pickup apparatus according to claim 5, wherein the MF switching unit comprises a display unit that is operable by the user.

7. The image pickup apparatus according to claim 1, wherein the lens apparatus is attachable to and detachable from the camera apparatus.

8. The image pickup apparatus according to claim 1, wherein the image pickup parameter includes any one among an aperture stop value, an ISO sensitivity, a shutter speed, and a white balance adjustment.

9. The image pickup apparatus according to claim 1, wherein in the first mode, the lens controller performs the manual focusing not depending on a setting of the camera apparatus.

* * * * *